Patented July 1, 1941

2,247,407

UNITED STATES PATENT OFFICE 2,247,407

MAKING PURE RUBBER AND DERIVATIVES THEREOF

James Wallace Raynolds, Pittsburgh, Pa., assignor to The Raolin Corporation, Charleston, W. Va., a corporation of West Virginia No Drawing. Application April 6, 1938,
Serial No. 200,536

4 Claims. (Cl. 260—772)

This invention or discovery relates to making pure rubber and derivatives thereof; and it comprises a method wherein a high grade commercial rubber is dissolved in a volatile non-aqueous solvent, the solution is dried, advantageously by boiling under a reflux condenser until there is a substantial and permanent reduction in viscosity and until all water present has gone forward as an azeotropic vapor mixture, the hot liquid is then agitated with a dry, adsorbent, pulverulent solid for a sufficient length of time to collect haze-forming impurities, the liquid is then separated from the collected solids, and the rubber is recovered from the solution, sometimes after conversion into a haze-free rubber chloride or other derivative; and it comprises pure caoutchouc and its derivatives, as produced by this method; all as more fully hereinafter set forth and as claimed.

Good crepe rubber or smoked sheet rubber is the nearest approximation to pure caoutchouc which is obtainable without chemical purification. Products which have been given repeated chemical treatments, such as the co-called "de-proteinized rubber," are purer than crepe rubber, but necessarily much more expensive.

Clean pale crepe rubber contains, as a small but important constituent, water-soluble and hygroscopic matter coming from the latex. This matter is usually called "proteid," but it includes various carbohydrates and other non-nitrogenous substances, as well as mineral matter, all of which are generally more or less hydrated. In good crepe rubber the amount of this foreign or non-rubber matter may be around 3 or 4 per cent, on a dry basis. In the hydrated condition, the proportion is higher. This is in addition to the resins, etc., which are readily removed by extraction. A typical analysis of a good grade of pale crepe rubber is:

| | Per cent |
|---|---|
| Ash | 0.3 |
| Resin (acetone extract) | 3.2 |
| Water extract | 0.3 |
| Sugars | 0.3 |
| Protein | 2.94 |
| Caoutchouc | Balance |

The importance of these non-rubber substances lies in the fact that their presence, to a large extent, conditions the ordinary physical properties of uncured rubber. They are presumably distributed in the rubber as gelatinous films, or in some network arrangement. The assumption is that the rubber occurs as bounded phases, with intervening proteid matter. This foreign matter is hygroscopic and rubber is not waterproof. In water, a piece of raw rubber swells and expands in time. And in curing or vulcanizing rubber, the hygroscopic properties are not wholly obviated, although they may be diminished. Hot milling of rubber to a plastic condition, although it does not change the rubber chemically, does change all its ordinary properties.

For most applications of rubber, this interiorly incorporated non-rubber component is not objectionable, and it may, in fact, be desirable. As stated, the ordinary properties of rubber are largely conditioned on its presence. There are, however, many uses of rubber in which this particular physical structure is not necessary and is undesirable. Among these uses is electrical insulation. No ordinary rubber insulation is waterproof; in time water will penetrate the best rubber insulation. In particular, rubber insulation is regarded as wholly impracticable for submarine cables. Cables are always insulated with something else.

All this is well known in the art and there have been many attempts made to remove the non-rubber impurities in rubber. Examples are creamed latex and commercial de-proteinized rubber, which is made by treating ("creaming") latex with proteolytic enzymes; pancreatin and the like. These deproteinized rubbers are distinctly better than the original rubber for insulating purposes, but they are not wholly satisfactory. Some of the so-called proteid matter always remains, even after creaming several times. Analysis of the best materials usually shows about 0.5 to 0.8 per cent of protein, with 0.1 per cent ash, 0.12 per cent water extract, and about 1.2 per cent of resins (acetone extract). These de-proteinized rubbers, while distinctly better for insulation than other rubbers, are not good enough for submarine and other exacting uses. In all shaped commercial rubber articles, cured or uncured, there are areas or spots of hygroscopic impurities which form an avenue for the entrance of moisture.

In other uses of rubber than insulation, these hygroscopic impurities are also objectionable. This is especially true with respect to the manufacture of rubber chloride, in which high purity is desirable. Rubber chloride which is free from the non-rubber substances normally associated with caoutchouc carries 64 to 66 per cent chlorine, and is an extremely permanent and resistant material. It is particularly well adapted for varnish coatings, when combined with something to obviate its brittleness. However, its stability and resistance to heat bear a direct relationship to its freedom from proteid matter, resins, and other normal impurities of rubber.

In making rubber chloride, a solution of rubber in carbon tetrachloride is chlorinated hot under a reflux. The non-rubber impurities are chlorinated more or less, and to the extent that they are present they contribute an element of instability to the rubber chloride. And, which in practice is much more serious, they furnish isolated spots and specks of hygroscopic material throughout the rubber chloride. It does not then give wholly waterproof varnishes and plastics.

In another and co-pending application, Ser. No. 69,415, filed March 17, 1936, of which the present application is a continuation-in-part, I have described and claimed the manufacture of a rubber chloride unaffected by moisture and free of distributed hygroscopic solids. In accordance with this prior application, rubber is first "hot" milled somewhat to homogenize it, and is then dissolved in carbon tetrachloride. This solution is boiled under a reflux for a long time, azeotropic vapor mixtures being permitted to pass away, carrying out all moisture present. At the end of the operation, the viscosity of the rubber solution reaches a minimum, and both the solution and the contained dispersed solids are completely desiccated. On chlorinating this solution to make rubber chloride, there is no water present to form HCl, and the dispersed desiccated non-rubber solids are apparently not much affected. After removal of excess chlorine and HCl, the liquid is a turbid, highly colored solution of rubber chloride, with the desiccated non-rubber solid particles in colloidal suspension. They are apparently extremely fine. This liquid I treat with a small amount, a per cent or so on the rubber chloride, of a commercial decolorizing carbon, such as "Eponite." The decolorizing carbon collects the dispersed colloid particles, apparently by solid-to-solid adsorption. But as the decolorizing carbon itself is extremely fine, in practice I also employ something coarser to facilitate its removal; usually one of the diatomaceous earth preparations, such as the commercial "Filtercel," "Filtros," "Hyflo-Filteraid," etc., which may be added directly to the solution. The rubber chloride solution, with the added solids, is kept hot—sometimes boiling—for a time, and is then filtered or passed through a centrifugal. With good operation, the clarified liquid is free of haze and suspended particles; it shows no Tyndal effect. On recovery of the rubber chloride from the clarified solution, varnishes and plastics can be made having unusual resistance against moisture and weather. This is attributed to the absence of hygroscopic solids occurring in spotwise distribution.

The above is made clearly evident by exposing varnishes made from the clarified rubber chloride to accelerated tests, such as condensing steam. In the presence of a carry-over haze from the rubber, there will be frosting or faulting of the film, and swelling. Another test is to coat metal, such as aluminum or tin-plate, with the clarified rubber chloride varnish, and expose the dried film to concentrated hydrochloric acid. If "haze" is carried over from the rubber, the metal is quickly attacked by the acid.

The point being to produce a rubber chloride free of disseminated desiccated fine particles of non-rubber solids, this may be accomplished by treating the original rubber solution in the same way; that is, prior to chlorinating it.

But I have discovered that rubber so treated has a wider range of utility than making rubber chloride; that a rubber freed of the natural disseminated, non-rubber solids is much better adapted for insulation, and a variety of other purposes, than is the original rubber.

In the present invention, therefore, I dissolve rubber in a boiling volatile liquid under a reflux condenser so arranged as to permit the escape of azeotropic vapors carrying water. In the prior application, practically the only solvent is carbon tetrachloride, if the solution is to be chlorinated. But in making pure rubber, all sorts of rubber solvents, including carbon bisulfide, coal tar light oils, etc., may be used, and their use is often more convenient than that of tetrachloride.

In all cases, the rubber is dissolved in the volatile solvent and the solution is boiled under a reflux condenser until the viscosity of the liquid ceases to diminish substantially, and until all non-rubber constituents are completely desiccated and converted into fine dry particles. I then add a per cent or so of fine adsorbent carbon, calculated on the rubber, together with about an equal quantity of a coarser adsorbent, and continue the boiling until collection of proteid, etc., is complete. The liquid is then filtered or passed through a centrifugal, as before, to give a bright solution free of non-rubber constituents. The coarser adsorbent or filteraid may be added during this separating stage, if desired. In either case, pure caoutchouc is recovered from the clarified solution.

Nearly all raw rubber contains a little resin and while its presence is negligible for most purposes, it is not desirable in making insulation. In the present method the pure rubber may be recovered by slowly adding the purified solution to boiling water to evaporate the solvent; however, a more advantageous method is to add the rubber solution to an alcohol, such as methanol, under conditions promoting intimate mixture and disintegration. This causes the pure rubber to be thrown out of solution as a precipitate, while the resin remains in solution in the solvent mixture, being readily soluble in the alcohol component.

The pure rubber recovered from the solution is dried and worked up into insulation etc., in the customary ways. It may be also chlorinated to give pure rubber chloride free of haze and hygroscopic impurities.

In a specific example of the present invention, it has been found in practice that in making a rubber chloride solution from raw rubber, it is useful to boil a solution of the rubber in carbon tetrachloride under a reflux for a number of hours, cooling conditions in the reflux condenser being so arranged that water in the system will pass forward as an azeotropic vapor mixture. Hydrated impurities are desiccated to dry solids. The long boiling has also the function of reducing the viscosity of the rubber and giving a more homogeneous sol; both contributing to the making of a better rubber chloride.

During this operation under the reflux condenser, the azeotropic mixture of tetrachloride vapor and H₂O can go forward beyond the condenser for condensation elsewhere. The boiling is continued long enough to get out all the water and completely desiccate the hydrated nonrubber impurities in the rubber, and to achieve the maximum practicable lessening in viscosity. This usually requires from 8 to 48 hours boiling.

With the rubber reduced in viscosity and the impurities desiccated, it becomes possible to purify the liquid with a filter or centrifugal. But the non-rubber particles are of colloidal minuteness and they neither settle nor filter readily. For this reason there is added to the hot liquid a per cent or so (on the rubber) of an adsorbent solid material which can be filtered, and the mixture is again advantageously heated or boiled under the reflux for a short time. This results in the collection of the fine haze-forming impurities by the adsorbent carbon, and the production of a liquid which can be filtered under pressure, advantageously in the presence of a coarser diatomaceous filteraid, to give a haze-free filtrate showing little or no Tyndall effect.

If rubber chloride is to be made, this liquid is then chlorinated by the introduction of free chlorine. Where a pure rubber for insulation or the like is wanted. the carbon tetrachloride is removed either by adding water and boiling, or by the methanol precipitation method in which the rubber separates from the mixture of carbon tetrachloride and alcohol. The wet rubber so obtained is then dried and worked up into insulation or the like. An insulating coating on a wire made with this rubber is as resistant to seawater as gutta percha or the other accepted insulators for submarine purposes, and its di-electric properties are more advantageous.

The purifying treatment described hereinabove may be repeated if an exceptionally pure product is desired, but this is seldom necessary, as a single treatment gives a product comparable in nitrogen content (proteid matter) with "deproteinized rubber" which has been "creamed" five times. My treatment may also be employed to further purify the deproteinized rubbers now available.

What I claim is:

1. A method of forming pure rubber chloride which comprises dissolving rubber in carbon tetrachloride, dehydrating the solution, agitating the hot dehydrated solution with dry, finely divided, inert adsorbent material which is substantially non-reactive with constituents of the solution and which collects haze-forming impurities therein, separating the liquid from the adsorbent and impurities collected thereby, chlorinating the rubber in the thus purified solution and eliminating the solvent.

2. The method of claim 1, wherein the solution is dehydrated by boiling under a reflux condenser until there is a permanent reduction in its viscosity and all water present has gone forward as an azeotropic vapor mixture.

3. The method of claim 1, wherein the said dry adsorbent material consists essentially of finely divided decolorizing carbon.

4. The method of claim 1, wherein the added dry adsorbent material consists essentially of finely divided decolorizing carbon which is removed with its collected solids from the solution with the help of a diatomaceous earth filter aid.

JAMES WALLACE RAYNOLDS.